United States Patent
Mautz, Sr.

[15] 3,678,561
[45] July 25, 1972

[54] JIFFY VEHICLE BRAKE TESTER PAD REMOVAL TOOL

[72] Inventor: William J. Mautz, Sr., 9 N. Circus Ave., Clearwater, Fla. 33515

[22] Filed: April 6, 1970

[21] Appl. No.: 26,017

[52] U.S. Cl................................29/267, 29/283, 248/122, 254/131
[51] Int. Cl..................B23p 19/04, A47g 29/00, B66f 3/00
[58] Field of Search..............29/233, 267, 278, 283, 270; 254/131; 248/122, 125; 294/16, 103

[56] References Cited

UNITED STATES PATENTS

| | | | |
|---|---|---|---|
| 1,863,039 | 6/1932 | Chandler | 294/103 UX |
| 1,646,165 | 10/1927 | Naiyoke et al | 248/122 |
| 3,304,041 | 2/1967 | Priore | 248/125 X |

Primary Examiner—Andrew R. Juhasz
Assistant Examiner—Leon Gilden

[57] ABSTRACT

A tool for lifting and removing a pad from rollers for cleaning or servicing purposes, the device comprising an elongated bar with a lower hook at the bottom thereof, the upper end of the bar forming a handle, a slideable sleeve, a longer bar supporting a top hook, and the lower portion of the bar being mounted upon a base having one end thereof secured by a brake to an intermediate portion of the bar.

1 Claim, 4 Drawing Figures

PATENTED JUL 25 1972          3,678,561
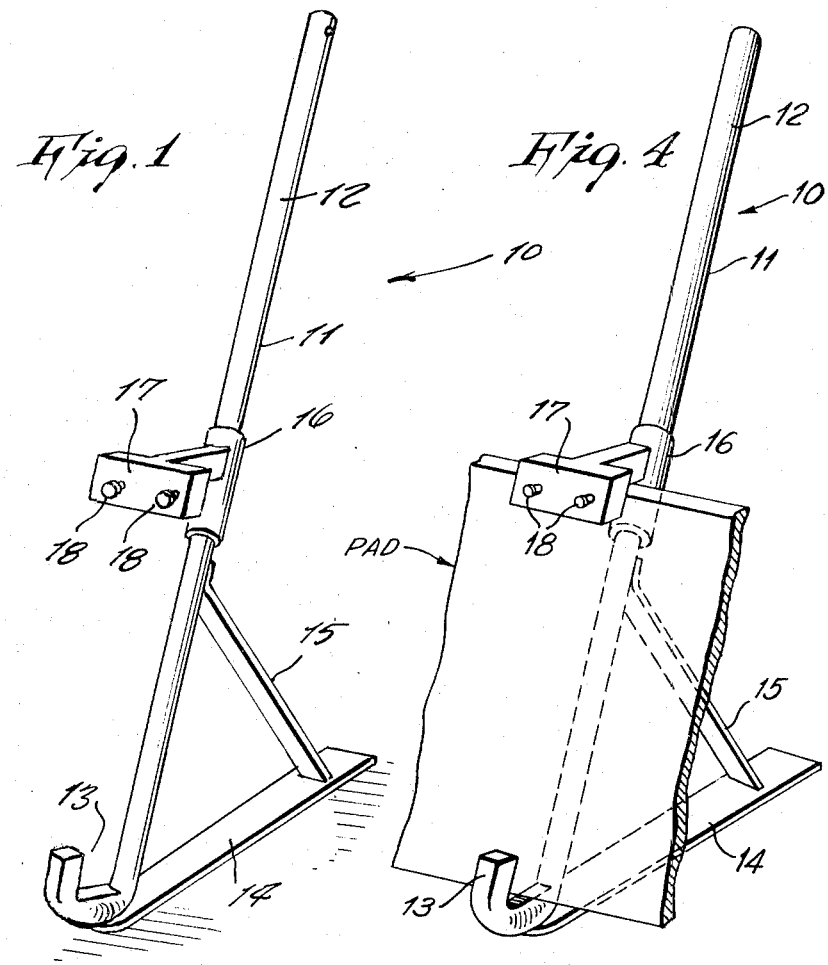
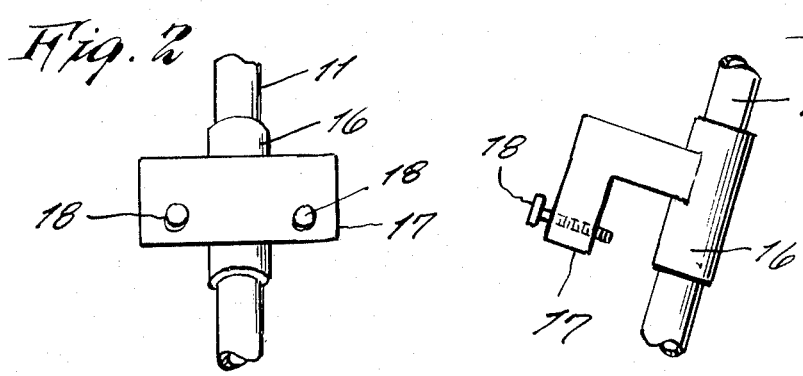
INVENTOR
WILLIAM J. MAUTZ, SR.

JIFFY VEHICLE BRAKE TESTER PAD REMOVAL TOOL

This invention relates generally to tools for maneuvering vehicle brake tester pads.

It is generally well known to those skilled in the art that vehicle brake tester pads are relatively heavy and difficult to maneuver. The approximate size of said pads are 24 inch by 108 inch or 36 inch by 144 inch. These are made of boiler plate steel of substantial thickness and accordingly quite heavy. The maneuvering of said vehicle brake tester pads usually requires several men with the use of an A frame or a chain hoist. This work is time consuming, dangerous and accordingly in the want of improvement.

Accordingly, it is the principal object of the present invention to provide a jiffy vehicle brake tester pad removeable tool whereby one person alone can manipulate the maneuvering of the vehicle brake tester pad.

Another object of the present invention is to provide a jiffy vehicle brake tester pad removal tool which promotes safety to the operator but offering less possibility of the operator crushing his fingers or toes, in addition to much less chance of a back injury.

Other objects of the present invention are to provide a Jiffy vehicle brake tester pad removal tool which is simple in design, inexpensive to manufacture, rugged in construction, and easy to use and efficient in operation.

These and other objects will be readily evidenced upon a study of the following specification and accompanying drawing wherein:

FIG. 1 is a perspective view of the present invention,

FIG. 2 is a fragmentary front elevation view thereof, and

FIG. 3 is a fragmentary side elevation view thereof.

FIG. 4 is a perspective view of the tool in use.

Referring now to the drawing in detail, the reference numeral 10 represents a jiffy vehicle brake tester pad removal tool according to the present invention wherein there is an elongated bar 11, the upper portion of which forms a handle 12 and the lower end of which is upwardly turned to form a lower hook, 13.

The bar 11 is normally supported in an upwardly inclined position by having the lower end thereof mounted upon a horizontal extending base 14 having a forward end thereof secured below the lower hook 13, and a rear portion of the base 14 being rigidly secured by means of an upwardly diagonally extending brace 15 the upper end of the brace being connected to a intermediate portion of the bar 11, as shown in FIG. 1 of the drawing.

A sleeve 16 is mounted slideably free along the upper portion of the bar 11, the sleeve supporting a forwardly extending top hook 17.

A pair of T studs 18 threadingly mounted in the top hook 17 are provided to normally engage an upper portion of the vehicle brake tester pad and secured to same in a supported position upon the tool.

In operative use, by simply laying the present tool across a brake tester pad, with the hooks pointed down, the lower hook 13 is hooked under the pad on one side and then the top hook 17 is positioned underneath the pad on the opposite side, after which the T stud bolts 18 are tightened. One person alone then can by grasping the handle lift and remove the pad from the rollers for cleaning or servicing purposes. By allowing the tool to lean back, while in upright position, the tool and pad will remain safely in an upright position out of the way for cleaning or maintenance personnel.

Thus by using the present jiffy vehicle brake tester pad removal tool, less manpower will be needed, no bulky equipment required, and there will be much less possibility of crushing the operators fingers or toes. Additionally there is less chance of a back injury.

What I now claim is:

1. In a jiffy vehicle brake tester pad removal tool, the combination of an elongated straight bar, an upper end of said bar forming a handle, a lower end of said bar being configurated so to form a lower hook and a top hook being slightly carried along an upper portion of said bar, said lower hook and said top hook being adaptable for grasping a vehicle brake tester pad there between, said bar being mounted in an upwardly inclined position upon a horizontal base secured at one end under said lower hook, an opposite end of said base being secured to a lower end of an upwardly diagonally extending brace, the upper end of said brace being affixed to a longitudinally intermediaet portion of said bar, said top hook being affixed upon a sleeve, said sleeve being slideably free along said bar, and said top hook having a plurality of T handle stud bolts in horizontal side by side, spaced apart arrangement, said T handle stud bolts threadingly being secured to said top hook for urging against a side of said vehicle brake tester pad supported below said top hook.

* * * * *